Aug. 14, 1956

M. ALDEN 2,758,906

DUAL ELECTRODE RECORDER

Filed June 13, 1950

Inventor
Milton Alden
by Roberts, Cushman & Grover
att'ys.

Aug. 14, 1956  M. ALDEN  2,758,906
DUAL ELECTRODE RECORDER
Filed June 13, 1950  2 Sheets-Sheet 2
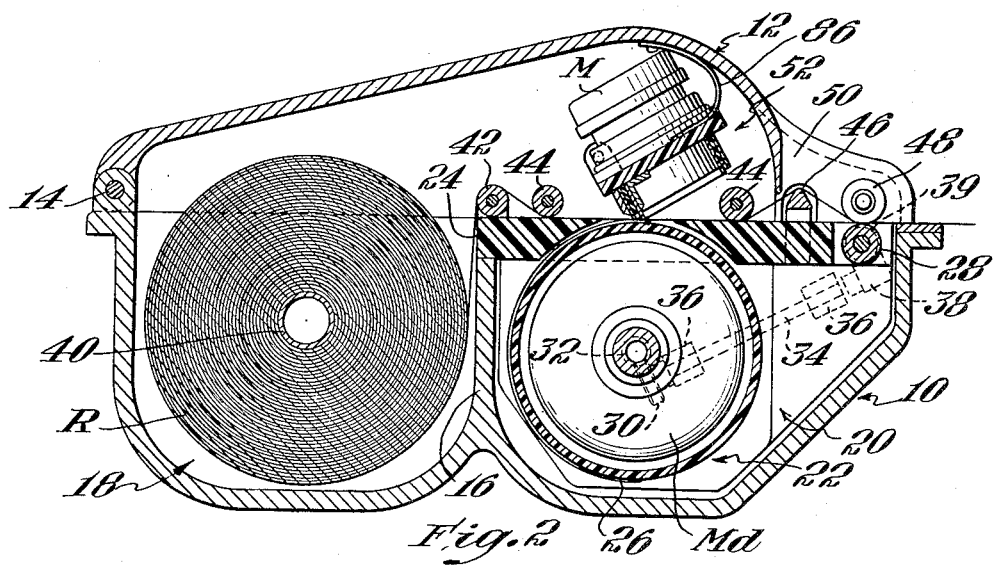
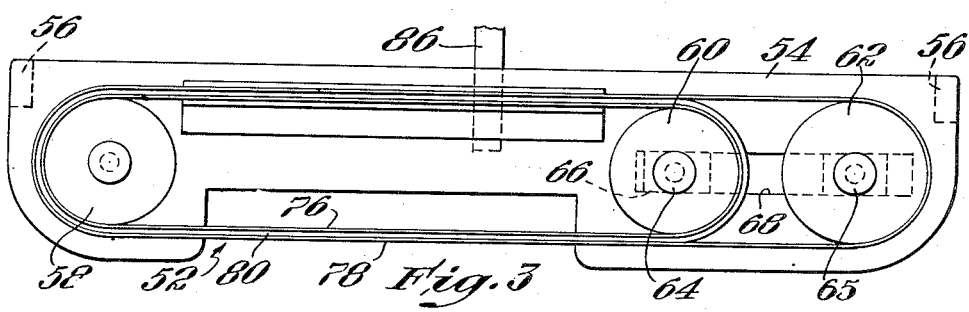
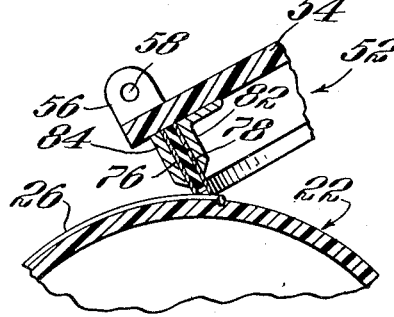
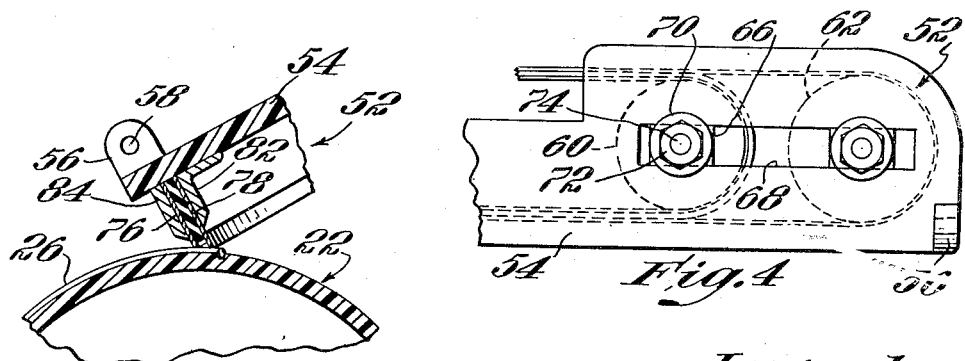
Inventor
Milton Alden
by Roberts, Cushman & Grover
att'ys.

United States Patent Office 2,758,906
Patented Aug. 14, 1956

2,758,906
DUAL ELECTRODE RECORDER
Milton Alden, Wellesley, Mass.
Application June 13, 1950, Serial No. 167,844
9 Claims. (Cl. 346—74)

In recorders of the helical type wherein a web of electrolytic paper is fed between a pair of recording electrodes which consist essentially of a conductor helically disposed about the periphery of a drum rotated with respect to a bar or blade comprising the other electrode, it is often desirable separately to record two or more signals. For example, the ordinary photoelectric cell used in facsimile has a low sensitivity with respect to the red portion of the spectrum and it is advantageous particularly when scanning copy in which red predominates to use a second photocell which is responsive to a different part of the spectrum and independently feed the signals from the respective photocells into the recorder. A recorder capable of handling independent input signals has the additional advantage of making it possible to separate the records by coding the signals or by employing signals having different energy levels.

It is possible to adapt a recorder to trace the input signals in different colors so that such a recorder can be used for color facsimile. The colored traces likewise may be used to distinguish the separate records so that the recorder may be employed as an instrument for simultaneously recording several input signals representative, for example, of variations in a number of simultaneous physical phenomena as a function of time. A recorder with multicolor traces is also very useful when used to record or duplicate business forms and records in a system similar to that shown in my copending application Serial No. 146,167, filed February 25, 1950.

Accordingly objects of this invention are to provide an electrode assembly for a recorder which will simultaneously record two or more independent input signals, which will record traces in different colors, which can be used for color facsimile, which is simple and economical in construction, which can be adapted to be used in existing recorders, which does not require any special skill on the part of the operator, and which advances the recording art generally.

In a broad aspect the invention contemplates in combination with a recorder of a recording electrode assembly comprising two or more recording elements or members which may be either stationary or movable ribbons, blades, strips or tapes of the same or different electrically conducting material. Each pair of adjacent elements or members is separated by a respective strip of insulating material which maintains the effective recording portions or edges of the members separated from each other and in parallel relationship. Means such as hangers are provided for supporting the electrode assembly from the cover, casing or other portion of the recorder so that the effective edges of the members are conjointly brought into contact with the surface of the recording paper.

These and other objects and aspects will be apparent from the following description of several specific embodiments of the invention referring to drawings wherein Fig. 1 is a plan view of one embodiment of the invention with the cover partially broken away;

Fig. 2 is a partial section on line 2—2 of Fig. 1;

Fig. 3 is a bottom view of the electrode assembly;

Fig. 4 is a fragmentary plan view of one end of the top of the electrode assembly;

Fig. 5 is a fragmentary sectional view on line 5—5 of Fig. 1;

Figure 1:
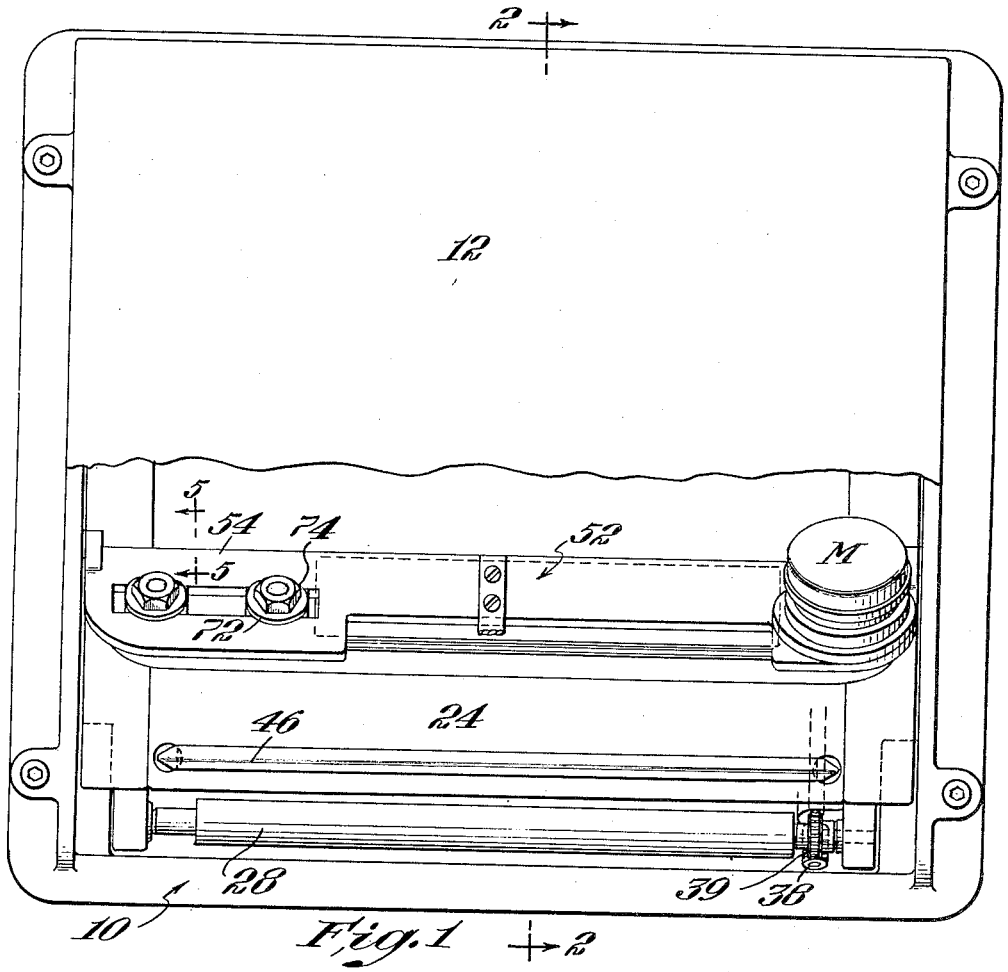

Referring particularly to Fig. 2 the first embodiment of the invention consists of a recorder comprises a casing including a housing 10 to which is pivotally attached a cover 12 by means of hinges 14. The housing 10 is divided by means of a partition or barrier 16 into a magazine compartment 18 and a compartment 20 wherein is carried a drum electrode assembly 22. The top of the compartment 20 is closed by means of a platen 24 of insulating material wherein is arranged a slot which accommodates said drum electrode assembly 22 so that the outer surface thereof, whereupon is carried a helically disposed conductor 26, is substantially tangent to the top surface of the platen. The drum assembly 22 is rotated by means of a motor M$d$ which is preferably although not necessarily located within the drum 22 in a manner similar to that described in detail in my copending application Serial No. 149,182, filed March 11, 1950. The driving motor M$d$ also turns a paper feed roll 28 by means of a speed reduction unit comprising a gear 30 which engages a worm 32 upon the driving shaft of the motor. The gear 30 is carried upon one end of a shaft 34 which is journaled in bosses 36 protruding from the inner surface of the side wall of the drum compartment 20. The opposite end of the shaft 34 carries a worm 38 which engages a gear 39 (Fig. 1) upon the shaft of the paper feed roll 28 which is journaled in the housing 10 so that the periphery thereof is substantially tangent with the top surface of the platen 24.

The supply of electrosensitive paper R is carried upon a spool or bobbin 40 (Fig. 2) which is journaled in the magazine compartment 18. As the web of paper is unwound from the roll R, it is passed over an idler roll 42 whose ends are journaled in bosses extending upwardly from the housing 10 on either side of the platen 24, thence beneath two idler rolls 44 whose respective ends are journaled in the cover 12 so that the web is pressed against the top surface of the platen 24 and brought into contact with the conductor 26 upon the drum 22, thence over a triangularly shaped smoothing bar 46 to remove any wrinkles, and thence between the driven feed roll 28 and two cooperating idler feed rolls 48 which are journaled respectively upon two arms 50 extending outwardly from either side of the cover 12.

The cover 12 also supports a recording electrode assembly 52 such as is shown in Figs. 3 through 5. To this end an elongated frame or supporting member 54 of an insulating material such as a suitable plastic is provided with an ear 56 at each of the respective ends thereof. As is best shown in Fig. 5, each of the ears 56 is provided with an aperture which engages a correlated pin 58 extending from the side wall of the cover 12. Near one end of the supporting member 54 is journaled a pulley 58 driven by a very slow speed motor M which is mounted upon the opposite side of the supporting member. Two additional idler pulleys 60 and 62 are journaled at the opposite end of the frame 54. The pulleys 60 and 62 are idlers and their respective positions are adjustable with respect to the driven pulley 58. To this end the shaft 64 upon which the pulley 60 is journaled is held in a rectangular block 66 which is slidable within an elongated slot 68 in the supporting member 54. The block 66 is held in adjusted position by the force exerted by a washer 70 (Fig. 4) which is interposed between the undersurface of the supporting member 54 and a nut 72 carried upon a threaded stud 74 extending from the shaft 64.

Arranged about the pulleys 58 and 60 is a conducting member such as a tape or ribbon 76 of for example stainless steel whose ends are butt welded or otherwise connected to form an elongated loop extending between the pulleys 58 and 60. The tension in the ribbon 76 is adjustable by movement of the block 66 as described above. The pulley 62 is journaled in a similar manner to that described above so that the tension in a second ribbon 78 extending between the pulleys 58 and 62 can be adjusted in an analogous manner. Arranged circumjacent the ribbon 76 so that it is interposed between the ribbons 76 and 78 is a strip or belt 80 of insulating material which is formed whereby the ribbons 76 and 78 are electrically isolated from each other. It will be noted that the pulleys 58, 60 and 62 lie in a common plane and their diameters are such that the sides of the respective loops are parallel to each other. As is best shown in Fig. 5 the sides of the ribbons 76 and 78 whose edges form the effective recording portions of the electrode assembly are interposed between two stiffening members such as the channel 82 and the plate 84 which depend from the lower surface of the supporting member 54. These stiffening members serve to prevent buckling of the ribbons and hold the lower recording edges thereof in a substantially parallel relationship.

As described above the electrode assembly is pivotally mounted upon the cover 12 by means of the ears 56 and is pivoted downwardly by means of a bent leaf spring 86 one end of which is secured to the upper surface of the supporting member 54. The other end of the spring 86 is fastened to the undersurface of the cover 12 so that the effective recording edges of the ribbons 76 and 78 are urged towards the web of paper which is in contact with the platen 24.

Figure 6:
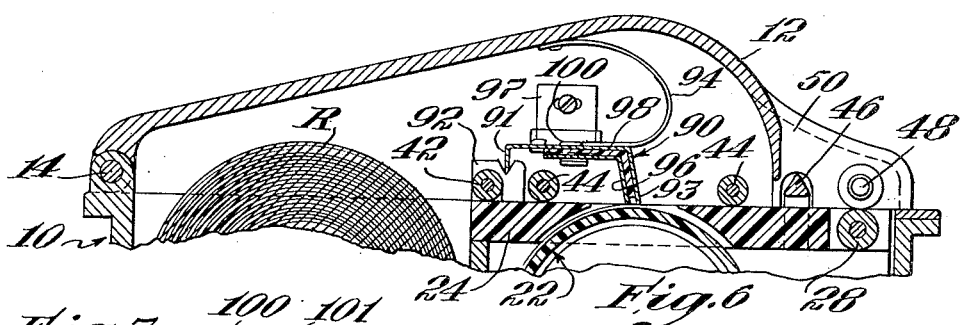
Fig. 6 is a partial sectional view in elevation of a second embodiment of the recorder.
Figure 7:
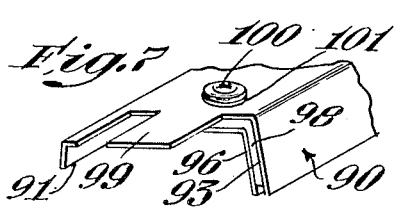
Fig. 7 is a fragmentary isometric view of the electrode assembly used in the recorder shown in Fig. 6.

A second embodiment of the invention is shown in Fig. 6 wherein the recorder illustrated is similar to that described in detail heretofore but is provided with a stationary type of electrode assembly. This electrode assembly comprises a substantially channel shaped member or blade 90 having a web portion at either end of which extend respectively a short flange 91 (Fig. 7) and a long flange 93 whose lower edge is one effective recording portion of the assembly. Upon the closure of the cover 12 the ends of the shorter flange 91 respectively engage the V-notches in two stops or blocks 92 which are carried upon the sides of the housing 10 so that the assembly is free to pivot thereabout under the influence of a spring 94 one end of which is fastened to the web of the channel shaped member 90. The other end of the spring 94 is attached to the undersurface of the cover 12 thereby to bring the effective recording edge of the flange 93 into contact with the web of paper carried by the platen 24. An L-shaped member 96 is arranged with one leg parallel to the web of the channel shaped member 90 and its other leg parallel to the longer flange 93 thereof so that the lower effective recording edge of the latter leg is also brought into contact with the paper. The members 90 and 96 are maintained in spaced relationship and electrically isolated by means of an L-shaped strip 98 of insulating material which is interposed therebetween. The members 90 and 96 are secured on the respective sides of the insulating strip 98 together as shown in Fig. 7 by a series of rivets 100, which pass through the members and strip being insulated therefrom by the grommets 101.

To lift the electrode assembly a pair of clips 97 similar to those described in detail in my copending application Serial No. 136,511, filed January 3, 1950 are fastened on either side of the cover to engage the tongues 99 (Fig. 7) located at either end of the recording element, thereby to lift the blade when the cover is lifted and permit it to pivot freely upon the V-notch blocks 92 when it is closed.

From the foregoing it will be apparent that in electrode assemblies of the types shown in both Figs. 2 and 6, the recording members or elements are electrically isolated from each other so that signals from the same or separate signal sources can be applied thereto. In the case of the stationary blades 93 and 96 of Fig. 6 the connections are made through electrical conductors (not shown) soldered or otherwise attached directly thereto. In the case of the moving ribbons 76 and 78 shown in Fig. 2, the electrical connections are made either through brushes (not shown) or through the shafts 64 and 65 of the idler pulleys 60 and 62 respectively. Both circuits have a common return path through the conductor 26 upon the drum electrode assembly 22.

By making the recording members of different conducting materials, for example of stainless steel and an alloy of copper, different ions can be deposited upon the web of the electrosensitive paper. In facsimile these color traces can be used for emphasis and for artistic effects such as outlining colors around letters. As additional signals can be recorded upon electrosensitive paper over other previously recorded signals so long as the paper remains moist, it will be apparent that signals from separate photoelectric cells responsive to different parts of the spectrum can simultaneously be recorded. This feature also makes it possible to use a recorder such as those described above for two color facsimile. A third recording element can be added for three color facsimile.

It is possible to make the recording elements of the same material but of varying widths so that their traces are distinguishable. The different traces can be distinguished in another manner by applying a greater potential to one of the blades so that its marking is of a darker shade; or by interrupting the signal to one code according to a predetermined code. Although in the electrode assemblies described above the effective recording edges are shown spaced closely together, by separating the blades more widely and correlating such separation with the scanning rate of a transmitter an echo signal can be used to produce relief maps or third angle projection effects.

It should be understood that the present disclosure is for the purpose of illustration only and that this invention includes all modifications and equivalents which fall within the scope of the appended claims.

I claim:

1. In combination with a recorder for electrosensitive paper having a rotatable drum carrying a helically disposed electrical conductor upon its periphery, a recording electrode assembly comprising two ribbons of conducting material each in the form of an elongated loop of which the edge of one side is the effective recording portion, an insulating strip in the form of a loop interposed between said ribbons so that the recording edges thereof are maintained in parallel relationship, means for moving the ribbons to compensate for wear and erosion of the effective edges thereof, and means for supporting said assembly concomitantly to urge the effective edges of said ribbons towards said conductor, the edges being separated therefrom by the paper so that the effective recording edges are in position to record simultaneously.

2. In combination with a recorder for electrosensitive paper having a rotatable drum carrying a helically disposed electrical conductor upon its periphery, a recording electrode assembly comprising two ribbons of electrically conducting material each having its respective ends joined to form a loop, an elongated supporting member having a first pulley journaled at one end thereof and two additional pulleys journaled at the opposite end thereof, the axes of the pulleys being in a common plane, one of the ribbons being arranged about the first pulley and one additional pulley, the other ribbon being arranged about the first pulley and the second additional pulley so that the ribbons form two elongated loops one side of each of which is contiguous the side of the other loop, the edges of the contiguous loop sides being the effective recording portions, an insulating strip interposed between said ribbons so that the recording edges thereof are maintained in separated relationship, a motor for rotating the first pulley so that the ribbons are moved to compensate for wear and erosion of the effective edges thereof, and means for supporting said assembly concomitantly to urge the effective recording edges of said ribbons towards said conductor, the edges being separated therefrom by the paper so that the effective recording edges are in position to record simultaneously.

3. In combination with a recorder for electrosensitive paper having a rotatable drum carrying a helically disposed electrical conductor upon its periphery, a recording electrode assembly comprising a channel shaped member having a web and two flanges normally extending from the ends thereof, the edge of one flange being an effective recording portion, an L-shaped member having one leg positioned parallel to the web of channel shaped member, its second leg whose edge is a second effective recording portion being parallel to the flange, an insulating strip interposed between said members so that the recording edges thereof are maintained in parallel relationship, and means for supporting said assembly concomitantly to urge the effective edges of said members towards said conductor, the edges being separated therefrom by the paper so that the effective recording edges are in position to record simultaneously.

4. In combination with a signal recorder for electrosensitive paper fed therethrough including a scanning electrode having a recording portion effectively movable transversely of the direction of paper feed, a recording electrode assembly comprising at least two elongate members of conducting material extending across the paper transversely to the direction the paper is fed, one side of each of said members being the effective recording portion opposed to and disposed to be traversed simultaneously by said scanning electrode, and insulating means supporting said members so that the effective recording portions thereof are maintained in close parallel relationship, electrically separate signal input terminals connected to said conducting members respectively, and means for supporting said assembly concomitantly to urge the effective portions of said members toward said scanning electrode, said portions being separated therefrom by the paper so that the effective recording portions are in position to record different signals simultaneously on contiguous portions of the same paper.

5. In combination with a signal recorder for electrosensitive paper fed therethrough including a first electrode having a recording portion effectively movable transversely of the direction of paper feed, a recording electrode assembly comprising two elongate loop members of conducting material, one side of each of said members being the effective recording portion opposed to and cooperating with said first electrode and an insulating strip in the form of a loop interposed between said loop members so that the effective recording portions thereof are maintained in close parallel relationship, means for jointly moving the conducting and insulating loops to compensate for wear and erosion of the effective portions of said conducting members, electrically separate signal input terminals connected to said conducting members respectively, and means for supporting said assembly concomitantly to urge the effective portions of said members toward said first electrode, said portions being separated therefrom by the paper so that the effective recording portions are in position to record different signals simultaneously on contiguous portions of the same paper.

6. In combination with a recorder for electrosensitive paper fed therethrough including a first electrode having a recording portion effectively movable transversely of the direction of paper feed, a recording electrode assembly comprising two members of conducting material each in the form of an elongated loop of which one side is the effective recording portion opposed to and cooperating with said first electrode and insulating means interposed between said loop members so that the effective recording portions thereof are maintained in parallel relationship, means for moving the loop members to compensate for wear and erosion of the effective portions thereof, and means for supporting said assembly concomitantly to urge the effective portions of said members toward said first electrode, said portions being separated therefrom by the paper so that the effective recording portions are in position to record simultaneously.

7. In combination with a recorder for electrosensitive paper fed therethrough including a first electrode having a recording portion effectively movable transversely of the direction of paper feed, a recording electrode assembly comprising two members of conducting material each in the form of an elongated loop of which one side is the effective recording portion opposed to and cooperating with said first electrode and relatively thin insulating means interposed between said loop members so that the effective recording portions thereof are maintained in close parallel relationship, means for moving the loop members to compensate for wear and erosion of the effective portions thereof, and means for supporting said assembly concomitantly to urge the effective portions of said members toward said first electrode, said portions being separated therefrom by the paper so that the effective recording portions are in position to record simultaneously on closely adjacent parts of said paper.

8. In combination with a recorder for electrosensitive paper fed therethrough including a first electrode having a recording portion effectively movable transversely of the direction of paper feed, a recording electrode assembly comprising two members of conducting material each in the form of an elongated loop of which one side is the effective recording portion opposed to and cooperating with said first electrode and an insulating strip in the form of a loop interposed between said loop members so that the effective recording portions thereof are maintained in parallel relationship, means for moving the loop members to compensate for wear and erosion of the effective portions thereof, and means for supporting said assembly concomitantly to urge the effective portions of said members toward said first electrode, said portions being separated therefrom by the paper so that the effective recording portions are in position to record simultaneously.

9. An electrode assembly according to claim 5 characterized in that said conducting elements are of different metallic composition, thereby to record in different colors on said paper.

References Cited in the file of this patent
UNITED STATES PATENTS

| | | |
|---|---|---|
| 173,718 | Edison | Feb. 22, 1876 |
| 2,005,108 | Pudelko | June 18, 1935 |
| 2,380,482 | Tribble | July 31, 1945 |
| 2,389,021 | Blain | Nov. 13, 1945 |
| 2,415,229 | Young | Feb. 4, 1947 |
| 2,505,779 | Long | May 2, 1950 |
| 2,579,831 | Keinath | Dec. 25, 1951 |
| 2,609,440 | Goldsmith | Sept. 2, 1952 |